United States Patent
Ando (10) Patent No.: US 12,179,355 B2
(45) Date of Patent: Dec. 31, 2024

(54) WORKPIECE UNLOADING DEVICE (71) Applicant: FANUC CORPORATION, Yamanashi (JP)

(72) Inventor: Toshiyuki Ando, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 245 days.

(21) Appl. No.: 17/904,604

(22) PCT Filed: Jun. 3, 2021

(86) PCT No.: PCT/JP2021/021162
§ 371 (c)(1),
(2) Date: Aug. 19, 2022

(87) PCT Pub. No.: WO2021/251259
PCT Pub. Date: Dec. 16, 2021

(65) Prior Publication Data
US 2023/0109541 A1 Apr. 6, 2023

(30) Foreign Application Priority Data
Jun. 9, 2020 (JP) .................................. 2020-099843

(51) Int. Cl.
*B25J 9/16* (2006.01)
(52) U.S. Cl.
CPC ................... *B25J 9/1612* (2013.01)
(58) Field of Classification Search
CPC .............. B25J 9/1612; B25J 9/1697; G05B 2219/40053; G05B 2219/40607; G05B 2219/45063
See application file for complete search history.

(56) References Cited

U.S. PATENT DOCUMENTS 11,345,041 B2 * 5/2022 Shimizu ............... G05D 1/0246
2012/0165986 A1 * 6/2012 Fuhlbrigge ........... B25J 9/1687
382/153
(Continued)

FOREIGN PATENT DOCUMENTS

| JP | 2010-184308 A | 8/2010 |
|----|---------------|--------|
| JP | 2013-052490 A | 3/2013 |

(Continued)

OTHER PUBLICATIONS

International Search Report issued in PCT/JP2021/021162; mailed Jul. 20, 2021.

*Primary Examiner* — Kira Nguyen
(74) *Attorney, Agent, or Firm* — Studebaker & Brackett PC (57) ABSTRACT

The purpose of the present invention is to provide a workpiece unloading device that can stabilize cycle time even when work for reversing a workpiece is involved. A workpiece unloading system comprises a workpiece unloading device for unloading a workpiece, and a control device for setting workpiece unloading order. The control device comprises: a storage unit that stores a set posture representing a posture of a workpiece when the workpiece is set on a jig; a current posture detection unit that detects a current posture representing the current posture of the workpiece; a change amount calculation unit that calculates a change amount between the set posture and the current posture; an unloading candidate identification unit that compares the change amount with a threshold value, and identifies, on the basis of the comparison result, a workpiece as an unloading candidate with priority; and an unload instruction unit that outputs, to the workpiece unloading device, a first instruction to unload the workpiece as the unloading candidate with priority.

3 Claims, 6 Drawing Sheets

(56) References Cited

U.S. PATENT DOCUMENTS

| | | | | |
|---|---|---|---|---|
| 2014/0316573 A1* | 10/2014 | Iwatake | ................. | B25J 9/1694 |
| | | | | 700/258 |
| 2015/0127162 A1* | 5/2015 | Gotou | .................... | B25J 9/1612 |
| | | | | 700/259 |
| 2016/0332299 A1* | 11/2016 | Suzuki | ................... | B25J 9/1697 |
| 2017/0151672 A1* | 6/2017 | Ando | .................... | B25J 9/1697 |
| 2018/0222046 A1* | 8/2018 | Gotou | .................... | B25J 9/1612 |
| 2023/0158667 A1* | 5/2023 | Urata | .................... | B25J 9/1612 |
| | | | | 700/246 |

FOREIGN PATENT DOCUMENTS

| | | |
|---|---|---|
| JP | 2017-102529 A | 6/2017 |
| JP | 2018-144159 A | 9/2018 |

\* cited by examiner

WORKPIECE UNLOADING DEVICE

TECHNICAL FIELD

The present invention relates to a workpiece removal device.

BACKGROUND ART

Workpieces may be removed from the state in which they are stacked in bulk and set in a specified jig. In this case, to efficiently calculate the position and posture of a workpiece using 3D matching, a technique to exclude a part of measurement data to be used for 3D matching based on the position and posture of the workpiece calculated by the position and posture calculation device is known (for example, see Patent Document 1).

Patent Document 1: Japanese Unexamined Patent Application, Publication No. 2017-102529

DISCLOSURE OF THE INVENTION

Problems to be Solved by the Invention

When a workpiece has a front and a back, the front and the back of the workpiece may be reversed and set in a jig using a reversing machine that reverses the front and the back of the workpiece, which is separate from the jig. When reversing a workpiece, it takes more time for the operation for reversing the workpiece than when directly setting the workpiece in a jig. Therefore, if the reversal operation is continuous, the cycle time for that period may become long, which may interfere with subsequent processes.

Technology is desired for a workpiece removal device that can stabilize the cycle time for removing workpieces, even when the operation of reversing the workpieces is involved.

Means for Solving the Problems

An aspect of the present disclosure includes a workpiece removal device that removes a workpiece from among workpieces and a control device that sets an order of removing the workpieces. The control device includes a storage unit that stores a setting posture, the setting posture being a posture of the workpiece when set on a jig, a current posture detection unit that detects current postures of the workpieces, an amount of change calculation unit that calculates an amount of change between the setting posture and each of the current postures, a comparison unit that compares the amount of change to a threshold value, a removal candidate identification unit that identifies a workpiece in which the amount of change is less than the threshold value as a priority removal candidate, and a removal instruction unit that outputs a first instruction for causing the workpiece removal device to remove the workpiece that is the priority removal candidate.

Effects of the Invention

According to the aspect, it is possible to stabilize the cycle time for removing workpieces, even when the operation of reversing the workpieces is involved.

PREFERRED MODE FOR CARRYING OUT THE INVENTION

An embodiment of the present invention is described below with reference to FIGS. 1 to 7.

1 Overall Configuration

Figure 1:
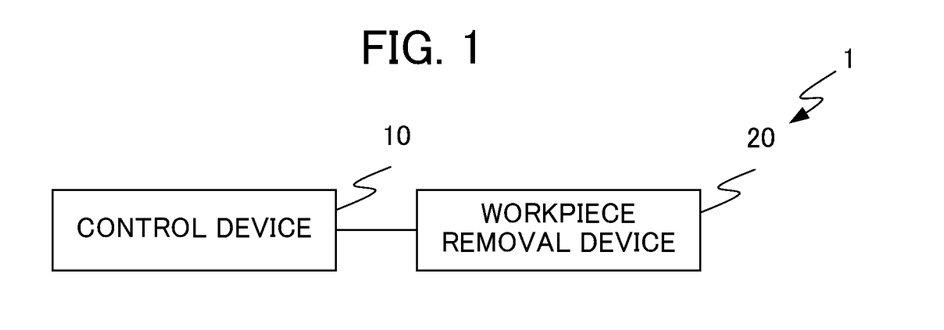
FIG. 1 shows the overall configuration of a workpiece removal system according to an embodiment.

FIG. 1 shows the overall configuration of a workpiece removal system 1 according to the present embodiment. The workpiece removal system 1 includes a control device 10 and a workpiece removal device 20. The control device 10 and the workpiece removal device 20 are communicably connected in a one-to-one pair. The control device 10 may be directly connected to the workpiece removal device 20 via a connection interface, or they may be connected to each other via a network such as a LAN.

The control device 10 controls the workpiece removal device 20, thereby causing the workpiece removal device 20 to perform a predetermined operation. Among other things, in the present embodiment, the control device 10 can set the order in which workpieces are removed by the workpiece removal device 20.

The workpiece removal device 20 removes workpieces one by one from a plurality of workpieces stacked in bulk. The workpiece removal device 20 may be a robot, for example. In this case, the robot is, for example, a 6-axis articulated robot, and includes a hand that can grasp a workpiece machined by a machine tool or a workpiece to be machined. The workpiece removal device 20, for example, removes and transports a workpiece according to an operation command generated by an operation program set in the control device 10.

2 Configuration of Control Device

Figure 2:
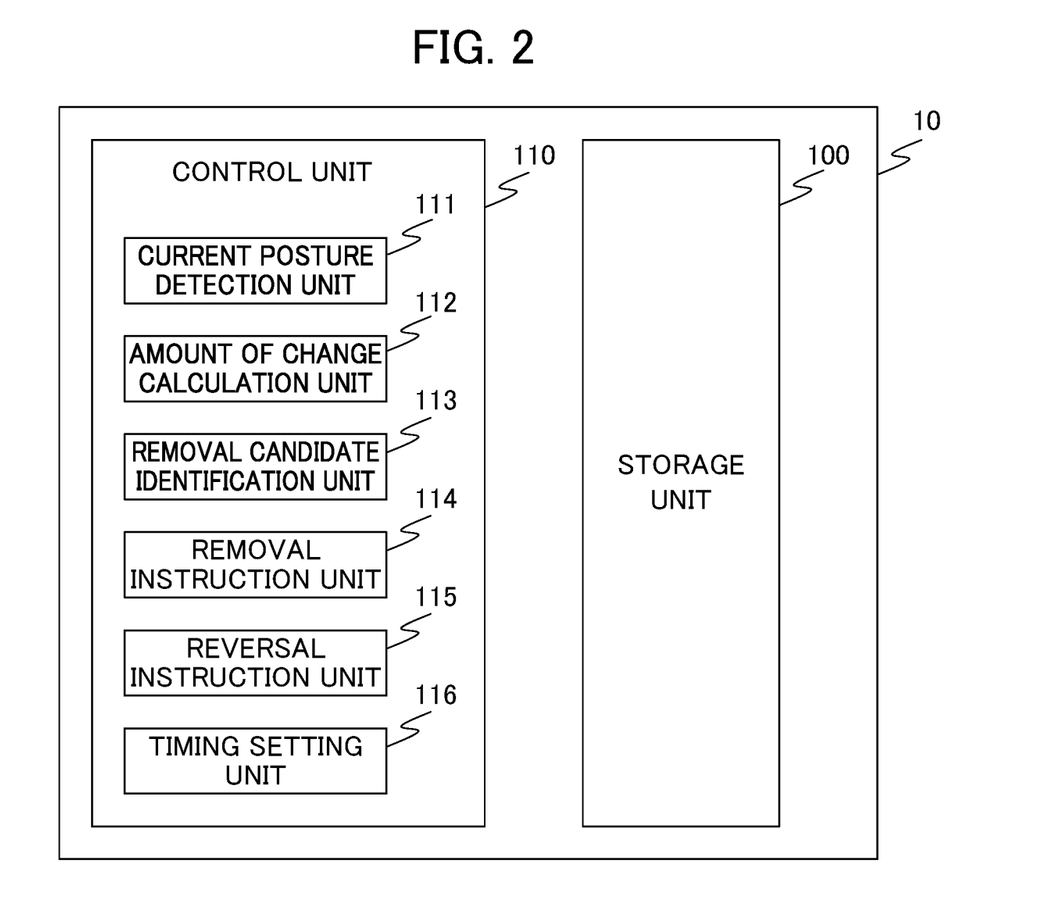
FIG. 2 is a functional block diagram of a workpiece removal device according to the embodiment.

FIG. 2 is a functional block diagram of the control device 10. As shown in FIG. 2, the control device 10 includes a storage unit 100 and a control unit 110.

The storage unit 100 stores a setting posture, which is a posture of a workpiece when set on a jig.

When the storage unit 100 stores the setting posture, the operator of the control device 10 performs a teaching operation on the control device 10.

More specifically, first, the operator teaches the control device 10 a physical outline model of the workpiece using 3D and CAD data of the workpiece. Second, the operator teaches the control device 10 the posture of the workpiece to be set on the jig.

Figure 3:
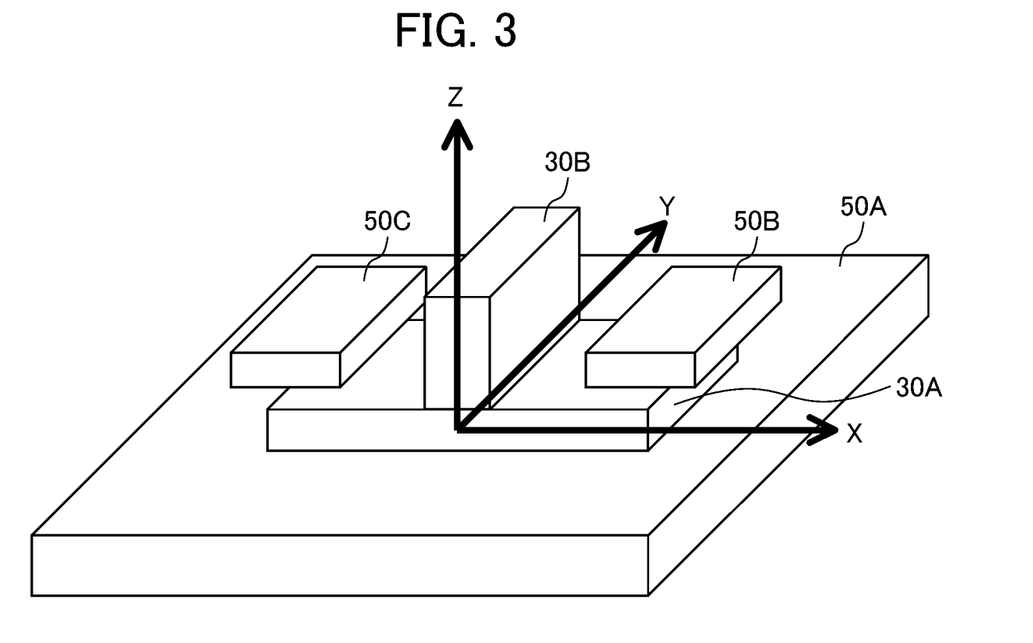
FIG. 3 shows the setting posture of a workpiece according to the embodiment.

FIG. 3 shows an example of the setting posture of a workpiece 30 on a jig 50, which is taught to the control device 10.

In the example shown in FIG. 3, the workpiece 30 is composed of a first rectangular parallelepiped 30A and a second rectangular parallelepiped 30B. The first rectangular parallelepiped 30A and the second rectangular parallelepiped 30B share the same length in a width direction, and the axes of both orthogonal to the width direction are 90° to each other.

The jig 50 includes a first rectangular parallelepiped 50A, a second rectangular parallelepiped 50B, and a third rectangular parallelepiped 50C. The first rectangular parallelepiped 50A is coupled to the second rectangular parallelepiped 50B and the third rectangular parallelepiped 50C. The first rectangular parallelepiped 50A supports the first rectangular parallelepiped 30A of the workpiece 30 from below. On the other hand, the second rectangular parallelepiped 50B and the third rectangular parallelepiped 50C hold the first rectangular parallelepiped 20A of the workpiece 30 from above. The second rectangular parallelepiped 30B of the workpiece 30 is placed between the second rectangular parallelepiped 50B and the third rectangular parallelepiped 50C of the jig 50 in a state in which the second rectangular parallelepiped 30B is separated from the second rectangular parallelepiped 50B and the third rectangular parallelepiped 50C.

In the workpiece coordinates of the workpiece 30, the longitudinal axis of the first rectangular parallelepiped 30A is X axis, and the axis that is included in the second rectangular parallelepiped 30B of the workpiece 30 and is in the normal direction of the first rectangular parallelepiped 30A is Z axis. The axis orthogonal to both the X and Z axes is Y axis.

The operator of the control device 10, as an example, teaches the control device 10 the physical outline model of the workpiece 30 as shown in FIG. 3 and the setting posture of the workpiece 30 on the jig 50. This enables the storage unit 100 to store the setting posture, which is a posture taken by the workpiece 30 when set on the jig 50.

The control unit 110 includes a CPU, a ROM, a RAM, a CMOS memory, and the like, which are known to those skilled in the art and configured to communicate with each other via a bus.

The CPU is a processor that entirely controls the control device 10. The CPU reads a system program and an application program stored in the ROM via a bus, controls the entire control device 10 according to the system program and the application program, and thereby, as shown in FIG. 2, the control unit 110 realizes the functions of a current posture detection unit 111, an amount of change calculation unit 112, a removal candidate identification unit 113, a removal instruction unit 114, a reversal instruction unit 115, and a timing setting unit 116.

The current posture detection unit 111 detects the current posture of the workpiece 30.

Figure 4:
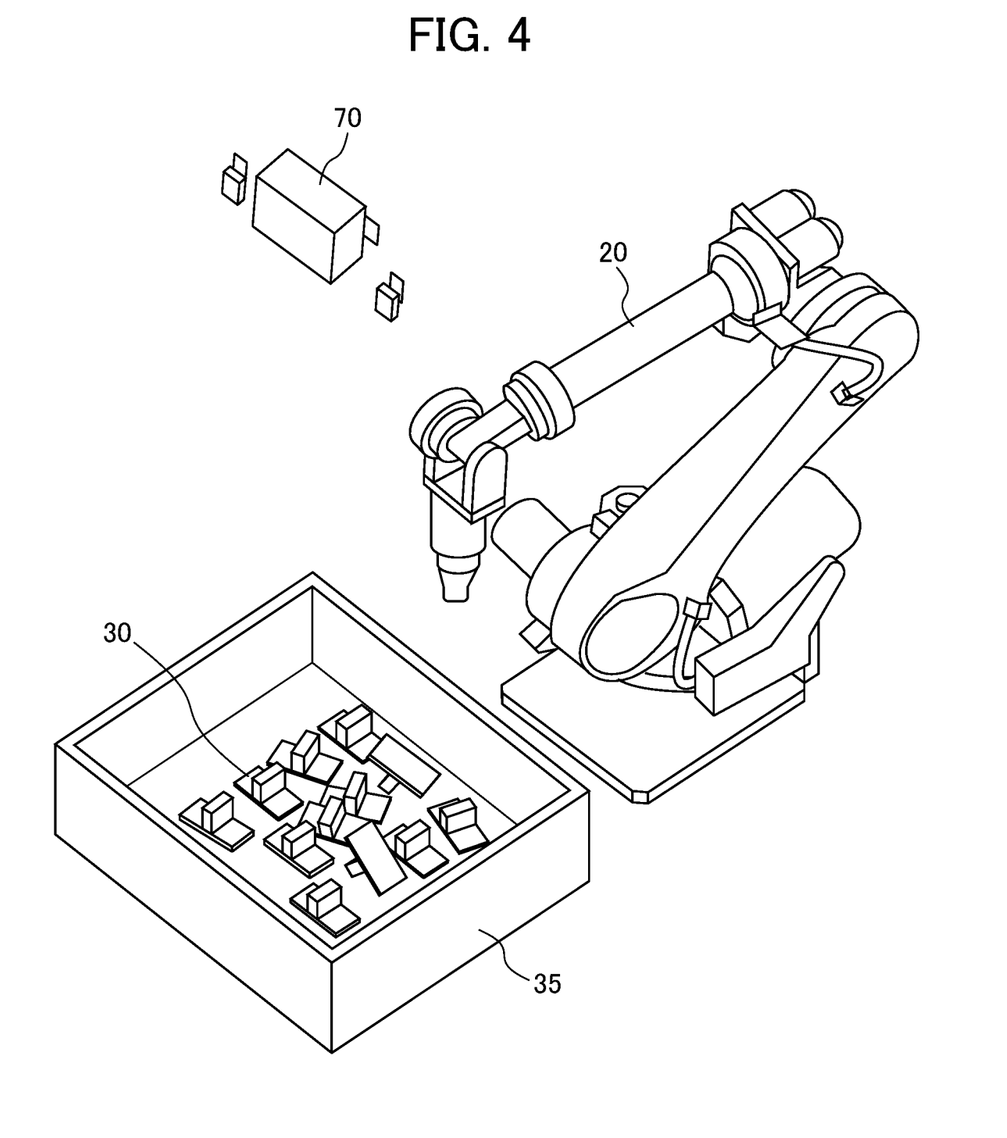
FIG. 4 shows a method of detecting the current posture of a workpiece according to the embodiment.
Figure 5:
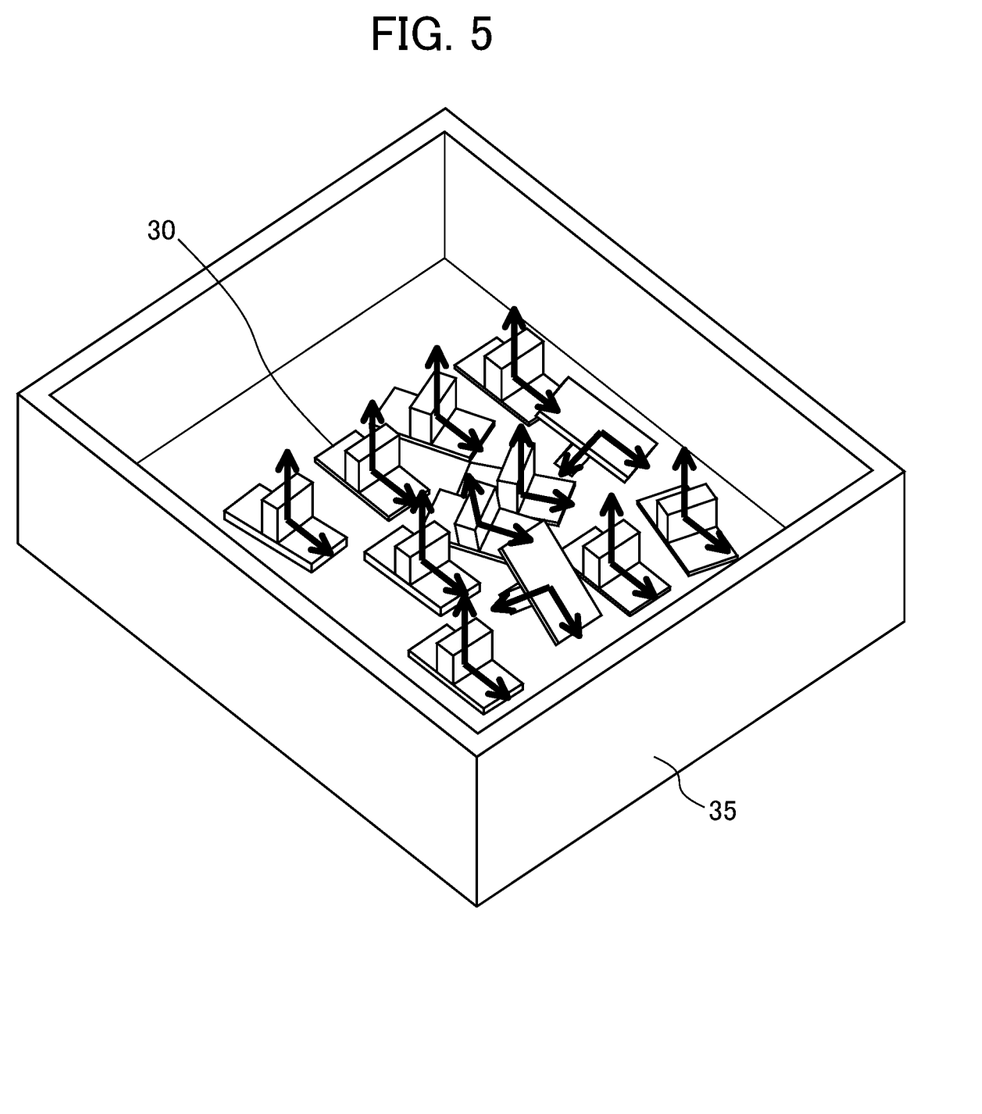
FIG. 5 shows a method of detecting the current posture of a workpiece according to the embodiment.

FIGS. 4 and 5 show examples of how the current posture is detected by the current posture detection unit 111. As shown in FIG. 4, a 3D sensor 70 is installed above the workpiece removal device 20 as a robot and a tray 35 in which a plurality of workpieces 30 stacked in bulk are stored. The current posture detection unit 111 uses images sensed by the 3D sensor 70 to detect the current position postures of the workpieces 30.

In particular, as shown in FIG. 5, the current posture detection unit 111 detects the above-described X axis and Z axis for each workpiece 30. These detected X and Z axes are used by the amount of change calculation unit 112 described below.

The amount of change calculation unit 112 calculates the amount of change between the setting posture and the current posture.

Figure 6A:
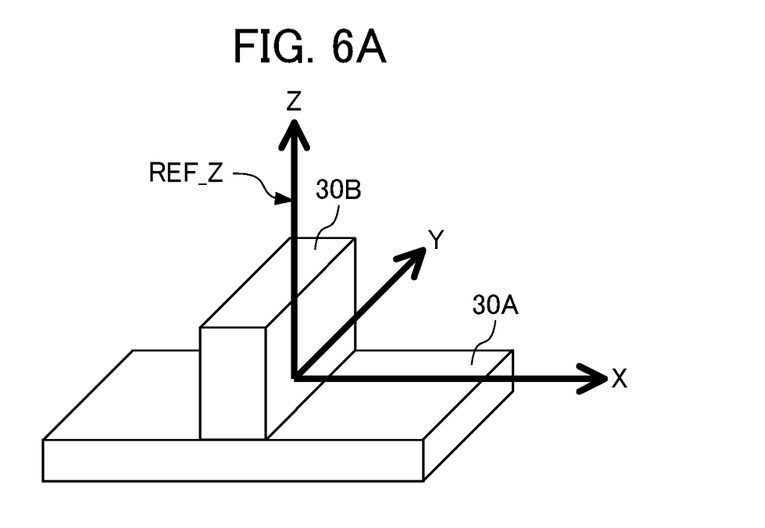
FIG. 6A shows a schematic of a calculation method of the amount of change between the setting posture and the current posture according to the embodiment.
Figure 6B:
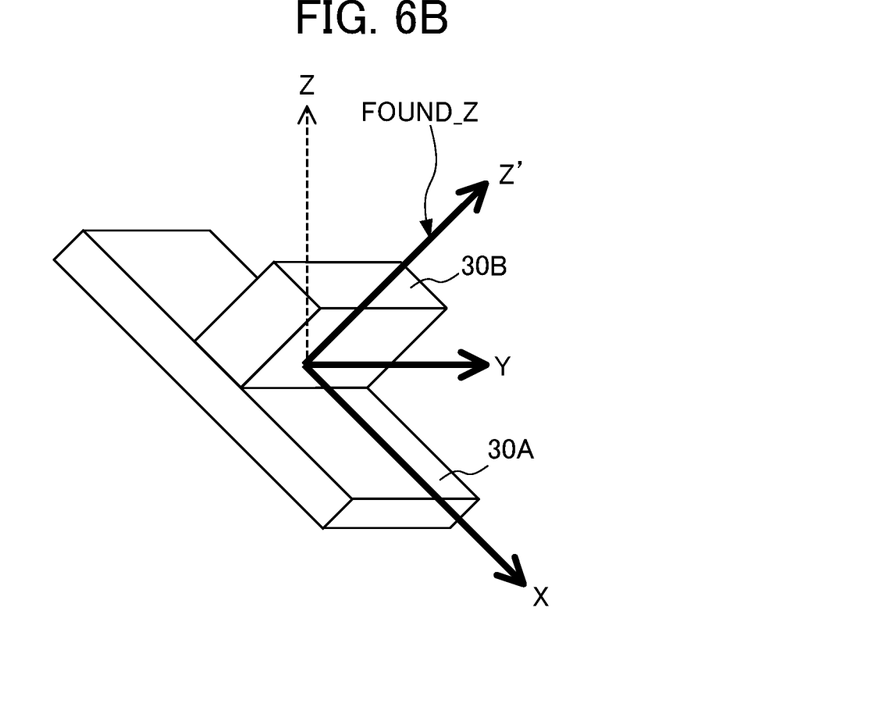
FIG. 6B shows a schematic of a calculation method of the amount of change between the setting posture and the current posture according to the embodiment.

FIGS. 6A and 6B each show a schematic of a calculation method of the amount of change between the setting posture and the current posture. As shown in FIGS. 6A and 6B, the above-described X, Y, and Z axes are set in the workpiece 30. In particular, FIG. 6A shows the X, Y, and Z axes when the workpiece 30 is in the setting posture. FIG. 6B shows the X, Y, and Z axes (Z' axis) when the workpiece 30 is in the current posture.

In FIG. 6A, the posture vector in the Z direction when the workpiece 30 is in the setting posture is defined as REF_Z. In FIG. 6B, the posture vector in the Z direction when the workpiece 30 is in the current posture is defined as FOUND_Z.

The amount of change calculation unit 112 calculates REF_Z·FOUND_Z, which is the inner product of REF_Z and FOUND_Z, as the amount of change between the setting posture and the current posture.

The removal candidate identification unit 113 compares the amount of change calculated by the amount of change calculation unit 112 to a threshold value, and identifies a workpiece 30 that is a priority removal candidate based on the comparison result.

The value of the inner product, REF_Z·FOUND_Z, which is the amount of change calculated by the amount of change calculation unit 112, is close to 1 when the detected current posture is close to the posture taken by the workpiece 30 when placed on the jig 50, and it is close to 0 when the detected current posture differs from the posture taken by the workpiece 30 when placed on the jig 50 by nearly 90°. When the Z axis direction is reversed, the value of the inner product, REF_Z·FOUND_Z is negative.

Therefore, when the value of the inner product, REF_Z·FOUND_Z, related to a workpiece 30 is less than 0 or smaller than a predetermined threshold value, the removal candidate identification unit 113 lowers the removal priority of the workpiece 30 since the operation of reversing the workpiece 30 is needed. Conversely, other workpieces 30 are identified as priority removal candidates.

Figure 7:
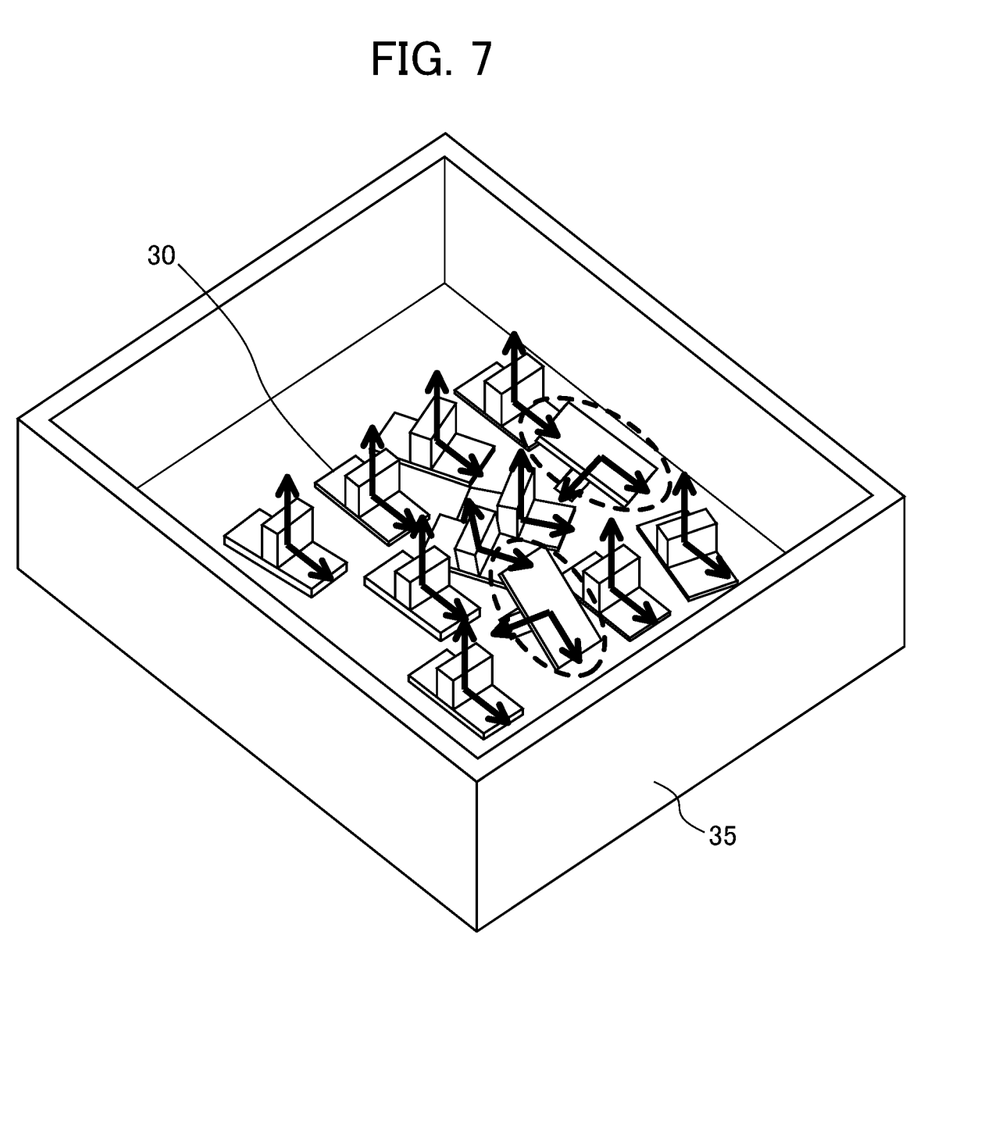
FIG. 7 shows a method for identifying priority removal candidates according to the embodiment.

FIG. 7 shows a specific example. As shown in FIG. 7, the removal candidate identification unit 113 marks workpieces 30 in which the value of the inner product, REF_Z·FOUND_Z is less than 0 or a predetermined threshold value or more (shown as ovals in FIG. 7) in an image sensed by the 3D sensor 70, and identifies the other workpieces as priority removal candidates.

The removal instruction unit 114 outputs a first instruction for causing the workpiece removal device 20 to remove the workpieces 30 identified as the priority removal candidates. Thus, the workpiece removal device 20 preferentially removes the workpieces 30 identified by the removal candidate identification unit 113.

When the rotation angle of the workpiece 30 in the current posture with respect to the workpiece 30 in the setting posture, which is calculated from the value of the inner product, REF_Z·FOUND_Z, is more than or equal to a predetermined value, the reversal instruction unit 115 outputs a second instruction for removing and then reversing the workpiece 30. Thus, the workpiece removal device 20 reverses and then removes the workpieces 30, which were not identified by the removal candidate identification unit 113.

The timing setting unit 116 sets the timing of the output of the second instruction output by the reversal instruction unit 115 to a predetermined timing. This eliminates the need to continuously remove the workpieces 30 that need to be reversed, thereby stabilizing cycle time.

Here, the "predetermined timing" refers to a timing when there is more than a certain amount of time before the next process. The "predetermined timing" may be, for example, a timing that does not affect the cycle of the next process, more particularly, it may be a timing such that workpieces are fully stored in a buffer for storing workpieces in a posture that allows them to be set on a jig. The "predetermined timing" may be a timing at which the workpiece that can be removed without being reversed cannot be recognized.

3 Operation of the Embodiment

In the workpiece removal system 1 according to the present embodiment, the control device 10 calculates the amount of change between the setting posture, which is a posture taken by the workpiece 30 when set on the jig 50, and the current posture of the workpiece 30, and identifies a workpiece 30 as a priority removal candidate based on a comparison result between the amount of change and a threshold value. The workpiece removal device 20 then preferentially removes the workpieces 30 identified as the priority removal candidates, and removes the other workpieces 30 at predetermined timing.

4 Effects of the Embodiment (1) A first aspect provides a workpiece removal system (e.g., the "workpiece removal system 1" described above) according to the above embodiment including a workpiece removal device (e.g., the "workpiece removal device 20" described above) that removes a workpiece from among workpieces (e.g., the "workpieces 30" described above), and a control device (e.g., the "control device 10" described above) that sets an order of removing the workpieces. The control device includes a storage unit (e.g., the "storage unit 100" described above) that stores a setting posture, the setting posture being a posture of the workpiece when set on a jig, a current posture detection unit (e.g., the "current posture detection unit 111" described above) that detects current postures of the workpieces, an amount of change calculation unit (e.g., the "amount of change calculation unit 112" described above) that calculates an amount of change between the setting posture and each of the current postures, a removal candidate identification unit (e.g., the "removal candidate identification unit 113" described above) that compares the amount of change to a threshold value and identifies a workpiece that is a priority removal candidate based on a comparison result, and a removal instruction unit (e.g., the "removal instruction unit 114" described above) that outputs a first instruction for causing the workpiece removal device to remove the workpiece that is the priority removal candidate.

This enables cycle time to be stabilized even when the operation of reversing workpieces is involved.

(2) In a second aspect according to the workpiece removal system of the first aspect, the amount of change calculation unit calculates, as the amount of change between the setting posture and each of the current postures, an inner product from a vector in any axial direction in the setting posture and a vector in the any axial direction in each of the current postures, in a workpiece coordinate system of the workpiece.

This makes it possible to execute a process to stabilize cycle time with a simple calculation.

(3) In a third aspect according to the workpiece removal system of the second aspect, the control device further includes a reversal instruction unit (e.g., the "reversal instruction unit 115" describe above) that outputs a second instruction for removing and then reversing the workpiece when a rotation angle of the workpiece in its current posture with respect to the workpiece in the setting posture is a predetermined value or more, the rotation angle being calculated from the inner product, and a timing setting unit (e.g., the "timing setting unit 116" described above) that sets a timing for outputting the second instruction to a predetermined timing.

This suppresses the continuous reversal operation of the workpieces 30 and stabilizes the cycle time for removing the workpieces.

EXPLANATION OF REFERENCE NUMERALS 1 workpiece removal system
10 control device
20 workpiece removal device
30 workpiece
50 jig
100 storage unit
110 control unit
111 current posture detection unit
112 amount of change calculation unit
113 removal candidate identification unit
114 removal instruction unit
115 reversal instruction unit
116 timing setting unit

The invention claimed is:

1. A workpiece removal system, comprising:
a workpiece removal device that removes a workpiece from among a plurality of workpieces and sets the workpiece on a jig separate from the plurality of workpieces and separate from the workpiece removal device; and
a control device that sets an order of removing the plurality of workpieces,
the control device, comprising:
a storage unit that stores a predetermined setting posture, the setting posture being a posture of the workpiece when set on the jig;
a current posture detection unit that detects current postures of each of the plurality of workpieces;
an amount of change calculation unit that calculates an amount of change between the setting posture and each of the current postures;
a removal candidate identification unit that compares the amount of change to a threshold value and identifies a workpiece that is a priority removal candidate based on a comparison result; and
a removal instruction unit that outputs a first instruction for causing the workpiece removal device to remove the workpiece that is the priority removal candidate.

2. The workpiece removal system according to claim 1, wherein the amount of change calculation unit calculates, as the amount of change between the setting posture and each of the current postures, an inner product from a vector in any axial direction in the setting posture and a vector in the any axial direction in each of the current postures, in a workpiece coordinate system of the workpiece.

3. The workpiece removal system according to claim 2, wherein the control device further comprises a reversal instruction unit that outputs a second instruction for removing and then reversing the workpiece when a rotation angle of the workpiece in its current posture with respect to the workpiece in the setting posture is a predetermined value or more, the rotation angle being calculated from the inner product; and a timing setting unit that sets a timing for outputting the second instruction to a predetermined timing.

* * * * *